United States Patent [19]
Allaire

[11] 3,815,463
[45] June 11, 1974

[54] MITER TABLE ASSEMBLY

[76] Inventor: Joseph Paul Allaire, 228 N.E. 22nd Ave., Apt. 4, Pompano Beach, Fla. 33062

[22] Filed: Jan. 31, 1973

[21] Appl. No.: 328,344

[52] U.S. Cl.............. 83/460, 83/471.3, 83/477.1, 83/489, 83/581, 144/286 R
[51] Int. Cl............................................ B26d 7/02
[58] Field of Search............ 144/288 R, 288 C, 285, 144/286 R, 286 A; 83/471.2, 471.3, 522, 477.1, 581, 488.1, 574, 763, 767, 460, 489

[56] References Cited
UNITED STATES PATENTS

| | | | |
|---|---|---|---|
| 1,832,283 | 11/1931 | Earhart | 83/471.3 |
| 1,952,518 | 3/1934 | Stowell | 83/767 X |
| 2,053,569 | 9/1936 | Ludwig | 83/767 |
| 3,342,226 | 9/1967 | Marcoux et al. | 144/286 R |
| 3,730,042 | 5/1973 | Price | 83/471.3 |
| 3,742,803 | 7/1973 | Allaire | 83/477.1 X |

*Primary Examiner*—Andrew R. Juhasz
*Assistant Examiner*—W. D. Bray

[57] ABSTRACT

A miter assembly adapted to produce miter cuts with a power saw, such as a rotary handsaw, and comprising a table having collapsible legs, an elongated base secured onto the table, an aperture through each of the two opposite lateral sides of the base and defining a transverse channel through the latter, a frame pivoted onto the base about an upright axis through the channel, spaced-apart strips to support a saw in projection into the channel and to perform all the angular and inclined miter cuts into the same channel, a locking device to lock the frame for a selected angular miter cut, and a self-adjustable and yieldable clamping device to clamp a piece of work on either side of the elongated base and the underside of the frame.

6 Claims, 7 Drawing Figures

PATENTED JUN 11 1974 3,815,463

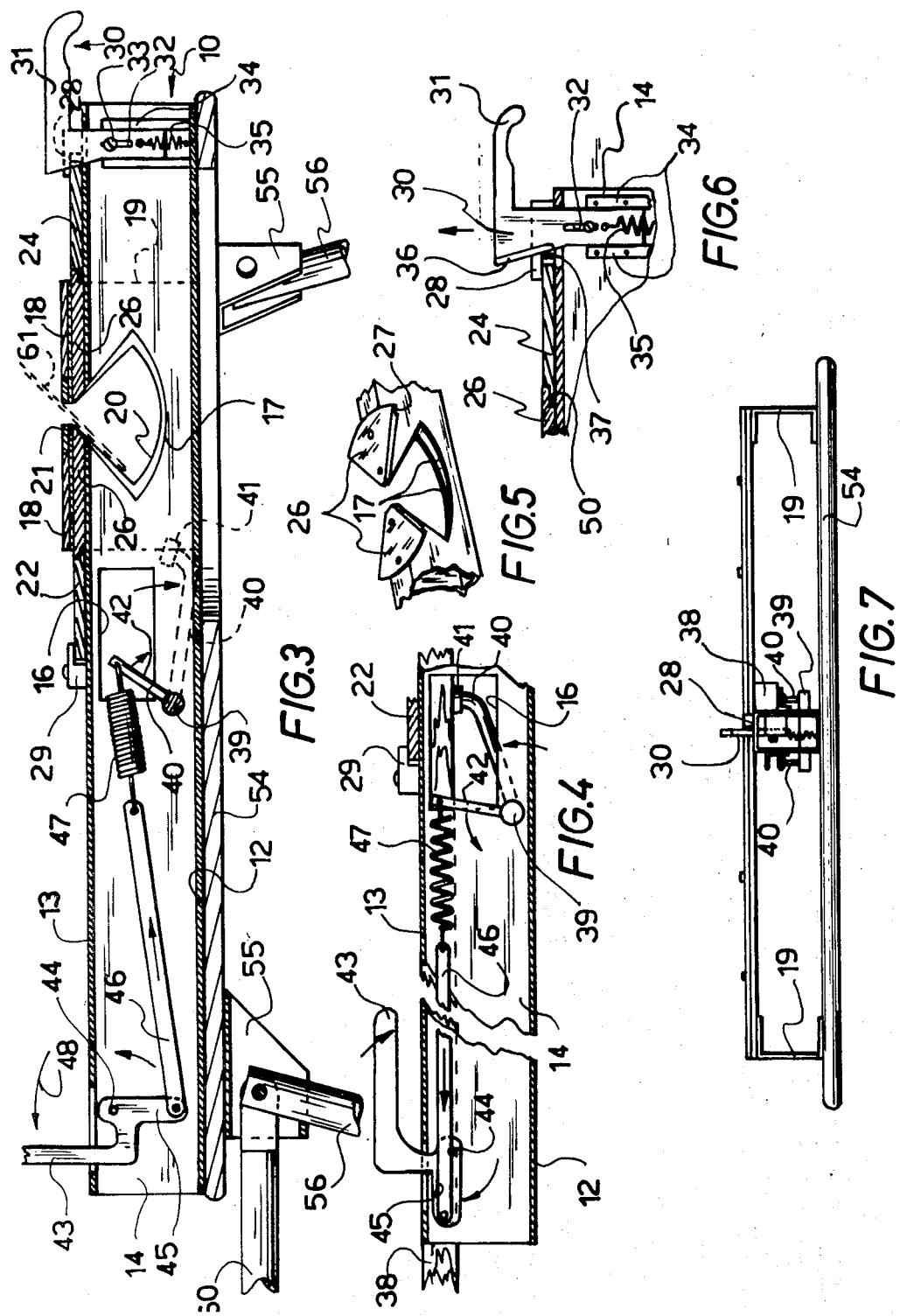

MITER TABLE ASSEMBLY

This invention relates to an accessory for a power saw and, more particularly, to a table assembly adapted to produce miter cuts with a power handsaw.

The miter attachments which have so far been proposed for power-operated saws, such as the well known rotary handsaws, lack versatility particularly in so far as the displacement and adjustment of the saw relative to the piece of work are concerned. There results a need to reposition the piece of work, in particular the moldings, to compensate for the above-mentioned lack of versatility.

My previous United States Pat. application Ser. No. 184,436, filed on Sept. 28, 1971 now U.S. Pat. No. 3,742,803, defines a miter attachment which has been given more versatility as compared to the aforementioned prior art miter attachments. This has been done in particular by forming a transverse channel for unobstructed passage of the saw from one side to the other of the base and by providing for clamping the pieces of work on either side of the elongated base, such that the saw may be handled from either side of the base and in both directions transversely of the latter. Besides, the afore-mentioned channel is arranged such that the saw may be inclined in either direction for any direction of displacement thereof.

However, the applicant has observed that his aforementioned miter attachment may be further improved for even more versatile and simple use thereof and particularly for convenience in transportation thereof from one job to another.

It is a general object of the invention to provide a miter assembly for a power saw which is versatile and simple to use and convenient for transportation from one job site to another.

It is another object of the invention to provide a miter assembly for a power saw, wherein the miter cuts are replaced by an appropriate transverse channel and which is pivoted about an upright axis extending through the path of the saw and which therefore dispenses with the need for miter cuts away from the transverse channel.

It is another object of the invention to provide a miter assembly for a power saw which includes a simple and yieldably self-adjustable clamping device to firmly hold the piece of work in the cutting position.

It is a further object of the invention to provide a miter table assembly for a power saw which includes a table and collapsible legs for the table to be easily portable for convenient use by a carpenter moving from one job to another. The miter table assembly further includes a removable shelf to rest the power saw thereon and an extension forming a stand to support the outer end of a piece of work in operative position for the cutting thereof.

The invention will now be described in detail with reference to a preferred embodiment thereof which is illustrated, by way of example only, in the accompanying drawings, in which:

FIG. 3 is a cross-sectional view as seen along line 3—3 in FIG. 2;

FIG. 4 is an enlarged partial view of the clamping assembly shown in operative clamping position;

FIG. 5 is a perspective view of the central portion of the elongated base;

FIG. 6 is an enlarged partial view of a locking assembly to secure the pivoted frame into a selected angular position; and FIG. 7 is an end view of a miter assembly as seen from the left in FIG. 3.

Figure 1:
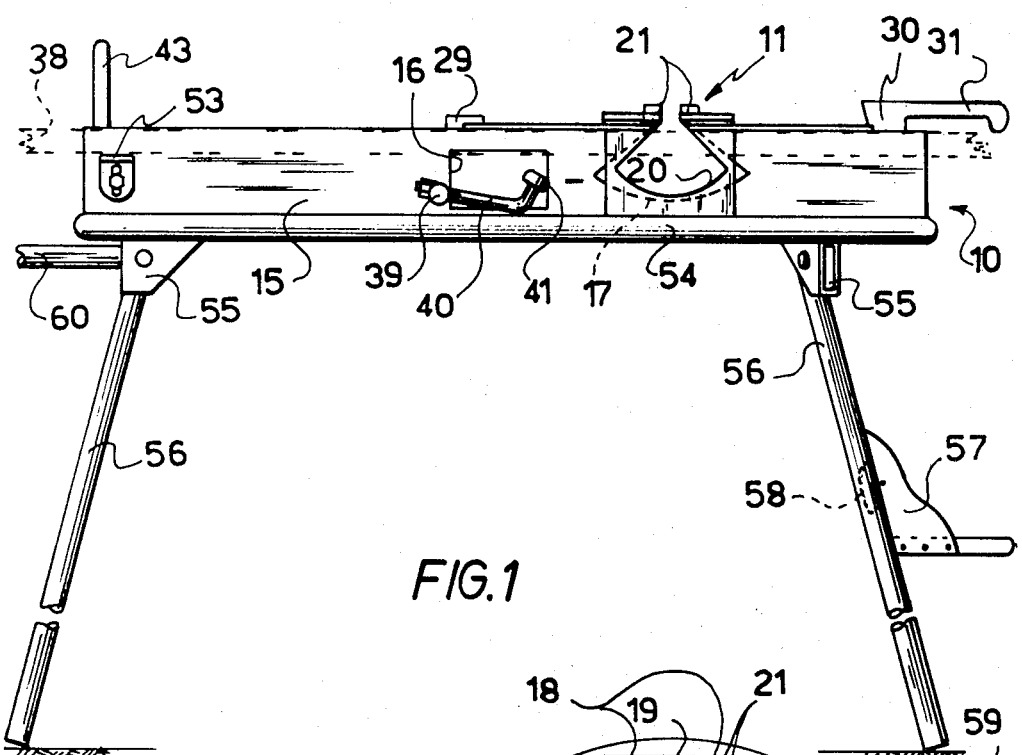
FIG. 1 is an elevation view of a miter table assembly according to the invention.

The illustrated miter table assembly includes a supporting and guiding elongated base 10 and a power saw guiding and supporting frame 11.

The base 10 includes an elongated hollow housing having bottom, top and side walls 12, 13, 14, and 15 respectively, an opening 16 into the side wall 14 and apertures 17 into the opposite lateral sides 14 and 15. The apertures 17 are transversely aligned to form a transverse channel or passage through the elongated base. The transverse passage and, in other words, the apertures 17 are shaped to allow the usual miter cuts including combinations of angular and inclined cuts.

Figure 2:
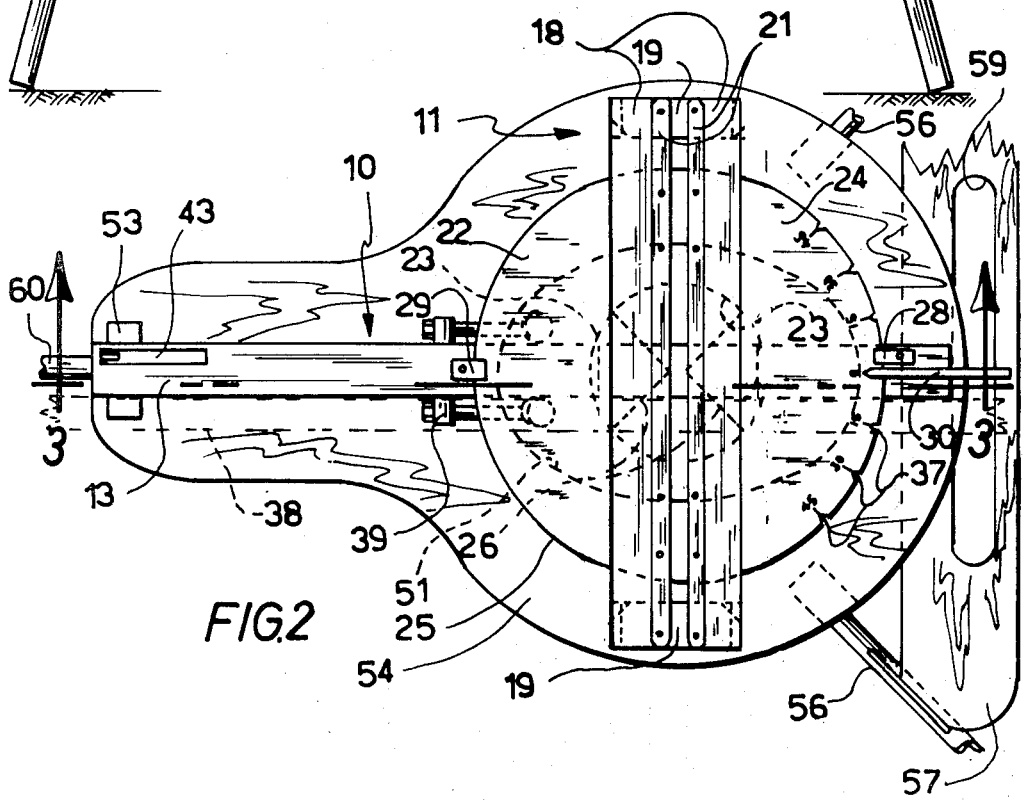
FIG. 2 is a top plan view of the miter assembly of FIG. 1.

The frame 11 which slidably supports the power saw is pivoted about an upright axis extending upwardly through the aforementioned transverse channel defined by the apertures 17. The frame 11 includes a pair of flat supporting strips 18 which are held parallel to each other by transverse U-shaped members 19 at opposite ends thereof. The U-shaped members 19 are each formed with an aperture 20 therethrough arranged into transverse alignment with the aforementioned apertures 17. The apertures 20 are slightly narrower than the apertures 17 and, as the latter, they taper upwardly from an arc-shaped bottom edge. A guiding metal strip 21 is secured to the inner edge of each supporting strip 18. As shown in FIGS. 2 and 3, the supporting strip 18 to the left is secured at its opposite ends to a semi-annular plate or support 22 for bodily rotation therewith and which may be cut out to reduce the weight thereof. The semi-annular plate 22 defines an inner arc-shaped edge 23. Another semi-annular plate or support 24 has the strip 18 on the right similarly secured thereto at its opposite ends and also has an inner arc-shaped edge 23. Both semi-annular plates 22 and 24 and the inner and outer arc-shaped edges 23 and 25 thereof are concentrically arranged relative to the afore-mentioned operatively upright pivot axis for the frame 11. The mentioned pivot axis is defined by a pair of sector-shaped plates 26 concentrically secured onto said base on opposite sides respectively of said transverse channel and radially inwardly of said semi-annular plates. Each of the sector-shaped plates has an outer arcuated edge which is undercut at 27 to form a lateral flange engaging over the inner arc-shaped rabbited edge 50 of the corresponding semi-annular plate 18 (see FIG. 6).

At the forward end of the base 10, a rotation guiding member 28 is screwed onto the top wall 13 and is provided with a flange frictionally overlying the outer circumferential edge 25 of the semi-annular plate 24. At the opposite end of the base 10, a similar guide member 29 is screwed onto the top wall 13 and is provided with a lateral flange or extension which frictionally engages and overlies the outer circumferential edge of the guide plate 22. The semi-annular guide plates 22 and 24 retain the frame 11 to ensure proper positioning of the strips 21 at the desired angles with respect to the base to allow projection of the saw blade into the transverse channel and lengthwise displacement along the latter.

To ensure that the frame 11 is held at the desired angle relative to the base 10 during the cutting operation, a wedge member 30 is provided having a handle portion 31 and a vertical slot 32 therethrough. A pivot bolt 33 extends transversely through the vertical slot 32 and is fixedly secured at its opposite ends to the base 10, allowing limited vertical displacement of the wedge member 30. A pair of brackets 34, or the like, form a guide for up-and-down sliding of the wedge member 30. The upper end of the latter projects outwardly of the housing formed by the base 10 through a slot extending lengthwise of the latter in the top wall 13 thereof. A tension spring 35 is connected to the lower end of the wedge member 30 and to the base 10 to bias the former downwardly. The rear edge of the wedge member 30 forms a sharper edge 36 for easier engagement into one of a plurality of notches 37 which are circumferentially spaced from each other along the outer circumferential edge 25 of the semi-annular plate 24. Therefore, when the wedge member 30 engages into one of the notches 37 under the bias of the spring 35, the frame 11 is locked into a corresponding angle relative to the base 10.

The wedge member 30 may be pulled upwardly against the bias of the spring 35 to produce disengagement of the sharp edge 36 from any notch 37, thereby allowing pivoting of the frame 11 about the aforementioned upright pivot axis thereof and relative to the base 10. Thus, the angular position of the frame 11 may be selectively set to produce the desired miter cut and the apertures 17 and 20 are of such width to allow free or unobstructed passage of the saw blade from one end to the other of the guide strips 18.

For the cutting operation, the piece of work 38, such as a strip of wood or a moulding, must be held against the underside of the frame 11 and the outer face of the side wall 14 or 15. A work holding or clamping device is provided for that purpose which is also arranged to form another means of holding the frame 11 in desired angular relation to the base 10.

The illustrated clamping device or assembly includes a pivot bar 39 extending transversely through the walls 14 and 15 adjacent the bottom edge thereof and rearwardly of the transverse channel defined by the apertures 17. A clamping arm 40 extends radially and forwardly from each end of the pivot bar 39 and has a rubber tip 41 at the free end thereof arranged to engage upwardly against the underside of the piece of work 38 to hold the latter tight against the underside of the semi-annular plates 22 and 24. Inside the base 10, the pivot bar 39 is provided with a lever arm 42.

A manual lever or handle 43 is pivoted about an axis 44 extending transversely through the base 10 and projects outwardly of the latter through a slot into the top wall 13. The inner end of the handle 43 is provided with an extension 45 to which is pivotally secured one end of a push pull rod 46. A tension spring 47 joins the other end of the rod 46 to the lever arm 43 for push pull action on the latter. As may be seen from a comparison of FIGS. 3 and 4, the pivoting of the handle 43 towards the frame 11 causes a pulling and extension of the spring 47 and a pivoting of the clamping arms 40 with a resulting engagement of the rubber tips against a piece of work 38 placed in a cutting position along either side of the base 10. The spring 47 allows yieldable engagement of the clamping tips 41 to account for pieces of work of different thicknesses. As may be seen in FIGS. 3 and 4, the extension 45 and the push pull rod 46 are arranged to form a toggle linkage to hold the handle 43 in clamping position. The work 38 may be simply removed and released by pulling on the manual lever 43 in the direction of the arrow 48 in FIG. 3.

A pair of vertically adjustable angle aluminum supports 53 are secured against the opposite sides respectively and at the end of the base 10 to carry the work 38 and prevent sagging thereof.

A table top 54, of any appropriate outline or form, has the base 10 secured thereon to be carried therewith. Table top 54 has an oval-shaped opening 51 opposite and centered relative to apertures 17. Cut pieces freely fall through this opening 51. Table top 54 forms a top surface slidably supporting U-shaped members 19, as shown in FIGS. 2 and 7, to stabilize frame 11 in any orientation of said frame relative to elongated base 10. Brackets 55 are secured against the underside of the table top 54 and legs 56 are collapsibly pivoted to the brackets 55 respectively to allow folding of the legs against the underside of the table top 54 for convenience in transportation of the miter device from one job site to another.

A shelf 57 is provided with hooks 58 adapted to engage into slots in a pair of adjacent legs 56 to be removably suspended to the latter. As may be seen in FIG. 2, the shelf 57 is formed with an aperture 59 therethrough and is arranged to support the power saw with the cutting blade thereof extending downwardly through the aperture 59. Shelf 57 also serves to keep the two legs 56 to which it is hooked in erected position, thereby preventing accidental folding of the same during work.

An extension including a boom 60 is arranged to be attached to the rear leg 56 and to project away therefrom in the direction of the base 10. The outer end of the extension forms a stand, not shown, arranged in any suitable manner to support the outer end of the work 38.

It should be appreciated that the extension represented by the boom 60 and the shelf 57 are arranged on opposite sides of the table to increase the equilibrium of the miter device. Besides, the latter is easily portable after detachment of the boom 60 and the shelf 57 therefrom.

The outer edges of guide strips 21 engage the edges of the two-part base plate of a conventional tiltable and portable electrically operated circular saw. The saw base plate can be slid along the entire length of the supporting strips 18 along guide strips 21 and moved off either end of strips 18 while the saw position can be reversed: the saw blade freely moves through the opening between strips 18 and through apertures 17 and 20 at any inclination of the saw blade 61 (FIG. 3) to the vertical between 0° and 45° and at any rotated angle of strips 18 relative to base 10 between 0° and 45°. As an example, with saw blade inclined at 45° and strips 18 at a 45° angle, the saw can cut a workpiece 38 having a maximum thickness of 1-9/16 inches and a maximum width of 4 inches. With the saw blade and strips 18 at 0°, the saw can cut a workpiece 38 of a maximum thickness of 2 inches and maximum width of 7 inches.

It will be easily understood, at least by persons skilled in the art, that the illustrated and afore-described embodiment defines many details of construction which may be modified while remaining within the principle and scope of the invention defined by the appended claims.

I claim:

1. A miter table assembly for a portable power-operated saw comprising a table top, an elongated base secured over said table top and having a channel extending transversely through said base and also opening upwardly thereof, a frame supported on top of said elongated base and pivotable relative thereto about an upright pivot axis, said frame including a pair of spaced-apart supports and a pair of spaced-apart strips attached to said supports, said supports and strips defining a straight slot therebetween registering with said channel, a pair of U-shaped connecting members rigidly interconnecting the ends of said supports and straddling said slot, said U-shaped members resting at their lower ends on said table top in sliding contact therewith, said supports extending laterally from opposite sides of said elongated base, said strips arranged to support and guide a portable power saw with the blade of said saw projecting through said slot and through said transverse channel for operative lengthwise displacement of the saw from one end to the other of said supports and transversely to the channel of said elongated base, said supports each including an arc-shaped portion concentric with said pivot axis, and rotation guiding devices mounted onto said base in juxtaposed position to said arc-shaped portions for guiding said frame for bodily rotation thereof about said pivot axis.

2. A miter table assembly as defined in claim 1, wherein each of said rotation guiding devices includes a lateral flange engaging the corresponding arc-shaped portion.

3. A miter table assembly as defined in claim 2, wherein each of said interconnected spaced-apart supports constitutes a substantially semi-annular plate, the inner arc-shaped edge of which forms one of said arc-shaped portions and said rotation guiding devices constitute sector-shaped plates concentrically secured onto said base on opposite sides respectively of said transverse channel and radially inwardly relative to said semi-annular plates and each having the outer arcuated edge thereof forming said lateral flange and arranged to engage over said inner arc-shaped edge of the corresponding semi-annular plate.

4. A miter table assembly as defined in claim 3, further including a work clamping means including clamping members, a toggle linkage, and a spring means interconnected between said clamping members and said toggle linkage and arranged to allow yieldable engagement of said clamping members with said piece of work.

5. A miter table assembly as defined in claim 4, further including a locking means constructed and arranged to releasably hold said frame at a selected angle relative to said elongated base, one of semi-annular plates including notches into the outer circumferential edge thereof and said locking means including a spring-biased wedge constructed and arranged to selectively engage into anyone of said notches whereby to hold said frame.

6. A miter table assembly as defined in claim 4, wherein said clamping members constitute a pair of clamping levers pivoted about a transverse axis and arranged to engage against the underside of said piece of work on opposite sides of said elongated base respectively, said toggle linkage includes a manual lever pivoted to said base about a transverse axis thereof, a push-pull link connected at one end to said manual linkage and at the other end to said spring means, and the latter is connected to said clamping levers and arranged to cause said yieldable engagement of the latter.

* * * * *